United States Patent [19]
Clay

[11] Patent Number: 6,036,141
[45] Date of Patent: Mar. 14, 2000

[54] JET THRUSTER FOR HELICOPTER ANTITORQUE AND YAW CONTROL SYSTEM

[75] Inventor: Dale E. Clay, Apache Junction, Ariz.

[73] Assignee: McDonnell Douglas Corporation, St. Louis, Mo.

[21] Appl. No.: 08/964,397

[22] Filed: Nov. 6, 1997

[51] Int. Cl.$^7$ .................................................. B64C 27/82
[52] U.S. Cl. ...................... 244/17.19; 244/52; 244/12.5; 244/51
[58] Field of Search ................................... 244/17.19, 51, 244/52, 73 C, 207, 12.5; 239/265.27, 265.23, 265.19, 265.31, 265.29, 2

[56] References Cited

U.S. PATENT DOCUMENTS

| | | |
|---|---|---|
| 3,026,068 | 3/1962 | Spearman . |
| 3,807,662 | 4/1974 | Velazquez . |
| 3,957,226 | 5/1976 | Daggett et al. . |
| 4,200,252 | 4/1980 | Logan et al. . |
| 4,660,785 | 4/1987 | Munski . |
| 4,711,415 | 12/1987 | Binden . |
| 5,676,335 | 10/1997 | Murgia et al. . |

*Primary Examiner*—Charles T. Jordan
*Assistant Examiner*—Tien Dinh
*Attorney, Agent, or Firm*—Westerlund & Powell, P.C.; Robert A. Westerlund; Raymond H.J. Powell, Jr.

[57] ABSTRACT

An improved jet thruster system for use in a helicopter without a tail rotor. A non-rotating outer thruster assembly is attached to the rear of the tail boom which, within it, has a source of low pressure air. The outer thruster assembly has a window on each side. Nested within the outer thruster assembly is an inner thruster assembly with a single window which rotates within the outer thruster assembly in response to commands from the helicopter control system. As the single window in the inner assembly is rotated around to where it overlaps with one or the other of the side windows in the outer assembly, an exit opening is created for the low pressure air which in turn creates a desired side force on the tail boom to counteract the torque created by the main rotor and also to provide yaw control for the helicopter. The interior of the inner thruster assembly contains vanes and an air ramp to efficiently redirect the air flow from axial flow to lateral flow within the inner thruster assembly. Diverters are employed on the lower edges of the side windows in the outer thruster assembly to produce a substantially pure horizontal force on the tail boom without a significant vertical component.

17 Claims, 3 Drawing Sheets

JET THRUSTER FOR HELICOPTER ANTITORQUE AND YAW CONTROL SYSTEM

BACKGROUND OF THE INVENTION

This invention relates to helicopters. More particularly this invention relates to directional thrusters used to impart lateral forces on the tail boom of a helicopter for antitorque and yaw control. Still more particularly, this invention relates to rotating thruster assemblies that shift air jet flow between the left and right sides of the tail boom.

Tail rotors have been the dominant means for providing yaw control in helicopters as well as overcoming the biasing torque produced by the main rotor. However, tail rotors contribute to over 15% of all helicopter accidents, largely through tail rotor strikes. The tail rotor is the largest cause of injury to ground personnel. The tail rotor also dominates the helicopter's acoustical signature and contributes substantially to the pilot's work load.

The concept of replacing the tail boom rotor on a helicopter with an air management system in an enlarged tail boom has been developed over the years, first by Hughes Helicopters, then by the Mc Donnell Douglas Helicopter Company, and, most recently, by the Boeing Company. The system has been employed on light helicopters and is commonly known by the trademark NOTAR®.

The NOTAR system uses air from a controlled circulation system in an enlarged tailboom for anti-torque and directional control. Airflow within the boom is generated by a variable pitch axial flow fan mounted in the helicopter fuselage. The low pressure air is released through slots along the right side of the boom and also through a directional jet thruster at the end of the boom. The released air from the slots on the right side of the boom captures the downwash from the main rotor, creating lift laterally along the boom, the same as airflow over the top of a wing. In this case however, the "lift" is to the side. In present systems, about 60% of the anti-torque needed in a hover is achieved in this fashion. Directional control is achieved by venting more air through the thruster at the end of the tail boom and also by use of pilot-controlled vertical stabilizers located on the boom.

The proportion of the force produced by each of these two subsystems depends upon the mode of flight of the helicopter. In high speed translational flight, the main rotor wake trails the tail boom, and, as a result, the slots on the right side of the boom produce essentially no side force, and all of the necessary force is provided by the jet thruster. When the helicopter is in hover mode, the circulation control from the slots in the boom provides about 60% of the anti-torque force required while the jet thruster provides the balance. It can be appreciated that the air flow through the jet thruster accounts for most of the energy needed by the NOTAR yaw control system.

The system, in an earlier form, is described in much more detail in U.S. Pat. No. 4,200,252 to Logan et al. for a "Helicopter Antitorque System Using Circulation Control." A later embodiment is described in U.S. Pat. No. 4,948,068 to VanHorn et al. for "Circulation Control Slots in Helicopter Yaw Control System." Both of these patents are owned by the assignee of the present invention and are incorporated by reference in their entirety.

The thruster system presently in use works well but has a number of areas that could be improved. For example, the thruster performance is marginal in certain wind azimuth conditions. The current design only produces about 60% efficiency, chiefly due to the need to have separate turning vanes inside the thruster for both left and right yaw. Also, the force vector produced by the current design is inclined downwardly from the desired horizontal direction, thereby inducing yaw/pitch coupling. In addition, the current design employs an outer rotating thruster assembly which tends to "drum" against the inner fixed thruster assembly and tends to prematurely wear out the thruster rollers between the outer and inner thruster assemblies.

Based on the above and foregoing, it can be appreciated that there presently exists a need in the art for an improved thruster design that will overcome the above-discussed drawbacks and shortcomings of the present thruster systems. This improved design should not be more costly than the present system and should deliver improved performance and maintenance costs.

As will become apparent hereinafter, the present invention fulfills this need in the art by reversing the inner and outer thruster assemblies such that the outer thruster assembly is in a fixed position with the inner thruster assembly now being the rotating assembly. Since the air deflecting vanes are within the inner thruster assembly, they can now be optimized for thrust in a single direction, greatly improving the efficiency of the system. Further improvements to the outer thruster eliminate the detrimental downward thrust component in the prior art systems, thereby decreasing pilot workload.

SUMMARY OF THE INVENTION

The present invention improves upon the current thruster system in several important ways. The orientation of the current outer rotating thruster assembly and the inner fixed thruster assembly is reversed. The fixed thruster assembly is now on the outside, and the rotating thruster assembly is on the inside. Since the rotating assembly is now on the inside, the entire interior of the rotating thruster can be optimized for air flow in a single direction—all to the left or all to the right, depending upon the rotational position of the inner thruster assembly. Finally, flow diverters are utilized on both sides of the boom to correct the force vector of the outflowing air to a substantially horizontal direction.

With the rotating thruster on the inside it is possible to use turning vanes which cover the entire inside diameter of the inner rotating thruster. The current design now in use has separate turning vanes for each side. This current design causes turbulence and does not use the entire thruster area, thereby contributing to the relatively low 60% efficiency mentioned above. The new design disclosed herein allows full flow to be used in whichever direction the inner rotating thruster is turned. Since the jet thruster uses most of the power expended in the yaw control system, this improvement in efficiency is significant.

Flow diverters, located on the lower edges of the thruster windows of the outer fixed thruster assembly, divert airflow out the selected thruster window into a horizontal path. This is particularly noticeable and beneficial in conditions where the window is only partially open. This eliminates the yaw-pitch coupling present in the currently used design. The preferred embodiment discussed at length below employs movable diverter plates that retract out of the airflow along the side of the boom when the window associated with that diverter plate is closed. However, there may be other embodiments in which the diverter plates are fixed open that produce satisfactory results.

In this invention, the inner rotating thruster is contained within the outer fixed thruster. The two then form a complete assembly that can be attached as a unit to the rear of the tail boom. This is an inherently more robust system than that in current use, and is easier to repair or replace.

BRIEF DESCRIPTION OF THE DRAWINGS

While the present invention is described herein with reference to illustrative embodiments for particular applications, it should be understood that the invention is not limited thereto. Those having ordinary skill in the art and access to the teachings herein will recognize additional modifications, applications, and embodiments within the scope thereof and additional fields in which the invention would be of significant utility.

DETAILED DESCRIPTION OF THE INVENTION

The present invention provides for much improved efficiency, increased effectiveness, reduced cost and better maintainability for the jet thruster portion of the NOTAR® anti-torque yaw control system.

Figure 1:
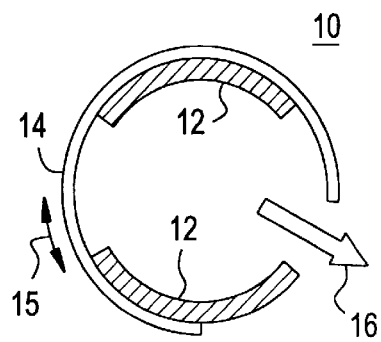
FIG. 1 is a cross sectional view of a prior art embodiment of the jet thruster system wherein the rotating thruster assembly is on the outside.

FIG. 1 is a cross sectional view of the prior art NOTAR® jet thruster 10 presently in use. The inner thruster assembly 12 is attached to the end of the tail boom of the helicopter (not shown) and does not rotate. The outer thruster assembly 14 nests over the inner thruster assembly 12. The outer thruster assembly 14 is rotated clockwise or counterclockwise as shown by the arrows 15 in response to commands from the control system of the helicopter. Looking forward on the helicopter, it can be seen in this view that the outer thruster assembly has been rotated counterclockwise into a position wherein the low pressure air within the tail boom is jetted out to the right and down as shown by the vector arrow 16. It can be readily appreciated that the downward component of the force vector will cause the tail boom to move upwardly in response thereto. This in turn requires that the pilot change the pitch on the main rotor to bring the helicopter back into proper trim. This is an added workload item for the pilot that is avoided by the improved jet thruster system of the present invention described herein.

Figure 2:
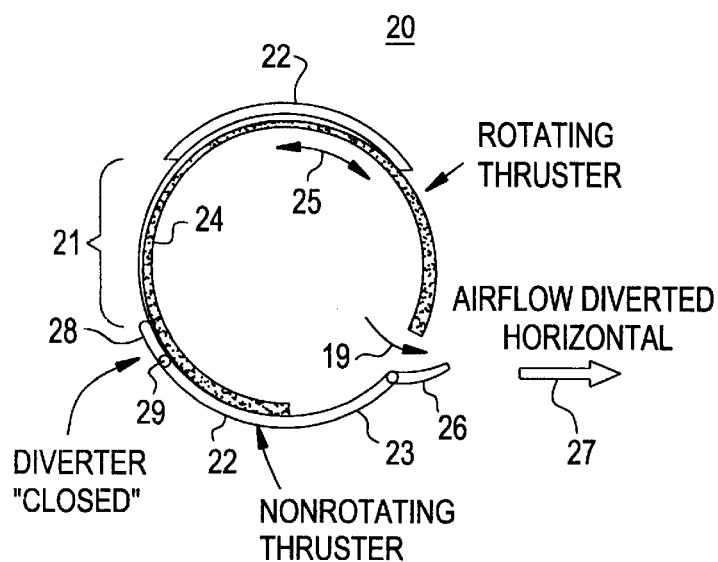
FIG. 2 is a cross sectional view of the present invention wherein the rotating thruster is on the inside. This view also shows the movable diverters.

FIG. 2 is a cross sectional view of the improved jet thruster system 20 of the present invention. The outer thruster assembly 22 is fixed in place against the end of the tail rotor (not shown). The inner thruster assembly 24 is nested within the outer thruster assembly 22. In this new system, it is the inner thruster assembly 24 that is rotated within the outer thruster assembly 22 in response to commands from the control system of the helicopter. The inner thruster assembly 24 can be rotated clockwise or counterclockwise as indicated by the arrow 25.

The improved jet thruster system 20 further includes the movable diverters 28 and 26. Since the jet thruster system 20 has been configured by the control system to direct the airflow to the right, the inner thruster assembly 24 has been rotated counterclockwise to create opening 19 between the inner thruster assembly 24 and the outer thruster assembly 22. The rotation of the inner thruster assembly 24 causes the right side movable diverter 26 to rotate outwardly about the hinge axis 23 located on the bottom edge of the opening in the right side of the outer thruster assembly 22. The mechanism that causes this action is discussed in detail below in conjunction with FIGS. 5 and 6. When the opening 19 is located on the right side, the left side movable diverter 28 will be in closed position, being rotated about its hinge axis 29 located on the bottom edge of the left side window 21 in the outer thruster assembly 22, into a position substantially flush with the outside surface of the inner thruster assembly 24.

With the airflow being directed to the right as shown in FIG. 2, the force vector 27 is now substantially horizontal due to the influence of the right side movable diverter 26 in the open position. The downward force component present in the prior art system of FIG. 1 is eliminated.

Figure 3:
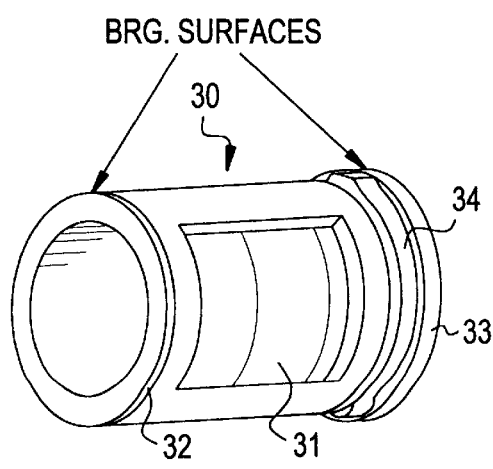
FIG. 3 is an isometric view of the rotatable inner thruster assembly; having lateral opposed windows and having a cam ring mounted thereon.

FIG. 3 depicts a preferred embodiment of the inner thruster assembly 30. It has but a single window 31 through which the low pressure air passes outwardly from the inside of the inner thruster assembly 30. This window could be alternatively constituted as a group of smaller windows 31a and 31b as shown in FIG. 3 a falling within the general outer perimeter of the single window 31 shown in this view. The inner thruster assembly 30 has fore and aft bearing surfaces 33 and 32, respectively, which bear against corresponding fore and aft bearing surfaces (not shown) on the inside of the outer thruster assembly 22. In this particular embodiment, a single cam ring 34 is shown. This cam ring is employed in conjunction with the mechanisms shown in FIGS. 5 and 6 to rotate the movable diverters 26, 28 in and out depending upon the rotational position of the inner thruster assembly 30. The cam ring 34 could alternatively be located at the other end of the inner thruster assembly 30, or cam rings could be used at both ends of the inner thruster assembly 30 as needed.

Figure 4:
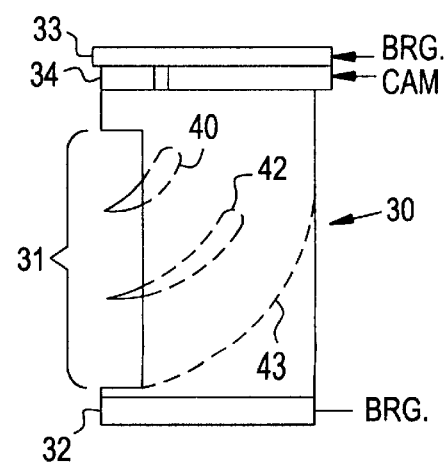
FIG. 4 is a top view of the rotatable inner thruster assembly with its window oriented to the left showing the configuration of the internal vanes and its inside surface, all of which are optimized to cause all the air to flow in a single direction.
Figure 3A:
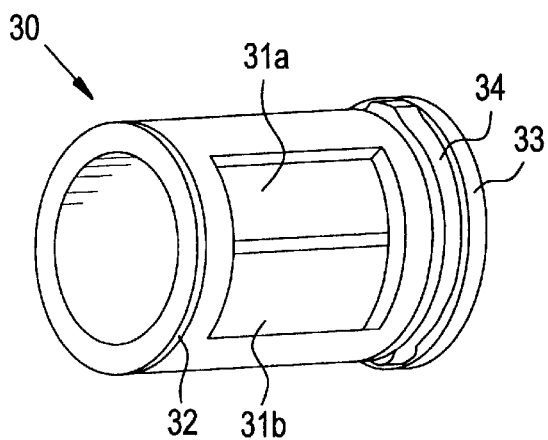
FIG. 3a is an isometric view of the rotatable inner thruster assembly having a plurality of laterally opposed windows on each side and having a cam ring mounted thereon.

FIG. 4 is another view of the inner thruster assembly 30 shown from the top with the window 31 facing to the left. The bearing surfaces 32 and 33 and the cam ring 34 are the same as in FIG. 3. The predominant features in this view are diverting vanes 40 and 42 and air ramp 43 built into the inside of the inner thruster assembly 24. The vanes and the air ramp cause the low pressure air from the source in the tail boom which flows axially into the upstream end of the inner thruster assembly to turn to the side in an efficient manner and with a minimum of turbulence inside the inner thruster assembly. This arrangement significantly increases the thrust produced by the air jet as it leaves the jet thruster as compared to the prior art system. Because there is but a single window 31 in the inner thruster assembly 30, the vanes 40, 42 and the air ramp 43 are optimized for flow in a single direction out through the window.

Figure 5:
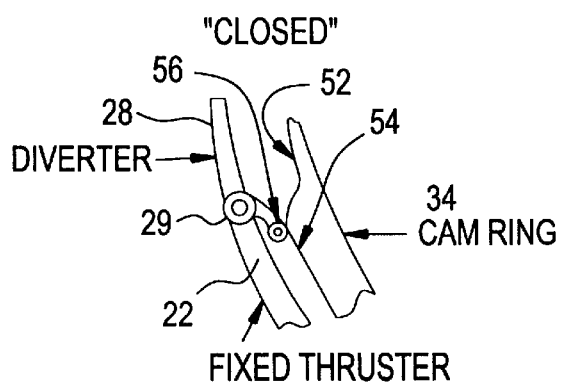
FIG. 5 is a cross sectional view of the components and operation of the movable diverter, showing the diverter in a closed position.
Figure 6:
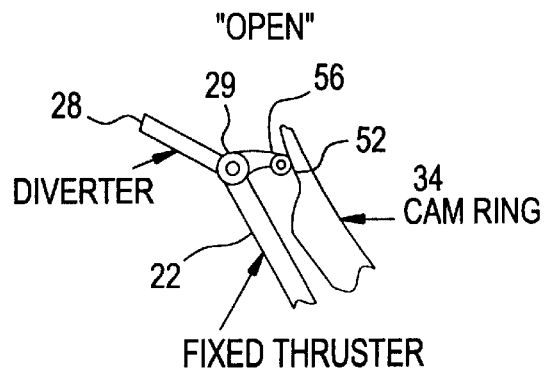
FIG. 6 is a cross sectional view of the components and operation of the movable diverter, showing the diverter in an open position.

The opening and closing of the diverters 26, 28 on the outer thruster assembly 14 is depicted in FIGS. 5 and 6. In FIG. 5, the cam follower 56 which is attached by an arm to the left movable diverter 28 has ridden up onto the high portion of the cam ring 34 on the rotating inner thruster assembly. This cam action holds the movable diverter 28 closed in a flush position against the outer surface of the inner thruster assembly 24 as shown in FIG. 2. When the inner thruster assembly 24 is rotated counterclockwise to move its window 31 around to the left side of the jet thruster assembly, the cam follower 56 moves down into the low spot 52 in the cam ring 34 and allows the diverter to rotate about its hinge 29 to the outside. This movement can be made more positive if a spring (not shown) or other biasing device is employed. The open position of the movable diverter 28 is shown in FIG. 6.

In some applications, it may not be necessary to use movable diverters but, rather, a diverter that is fixed in the open position may be sufficient. This could save weight and avoid the possibility of failure in the mechanisms necessary to impart movement to the diverters. Since less side force is typically needed on the right side of the tail boom, the fixed diverter might be deployed on that side alone. For ultimate weight savings fixed diverters could be used on both sides of the outer thruster assembly 22.

Figure 7:
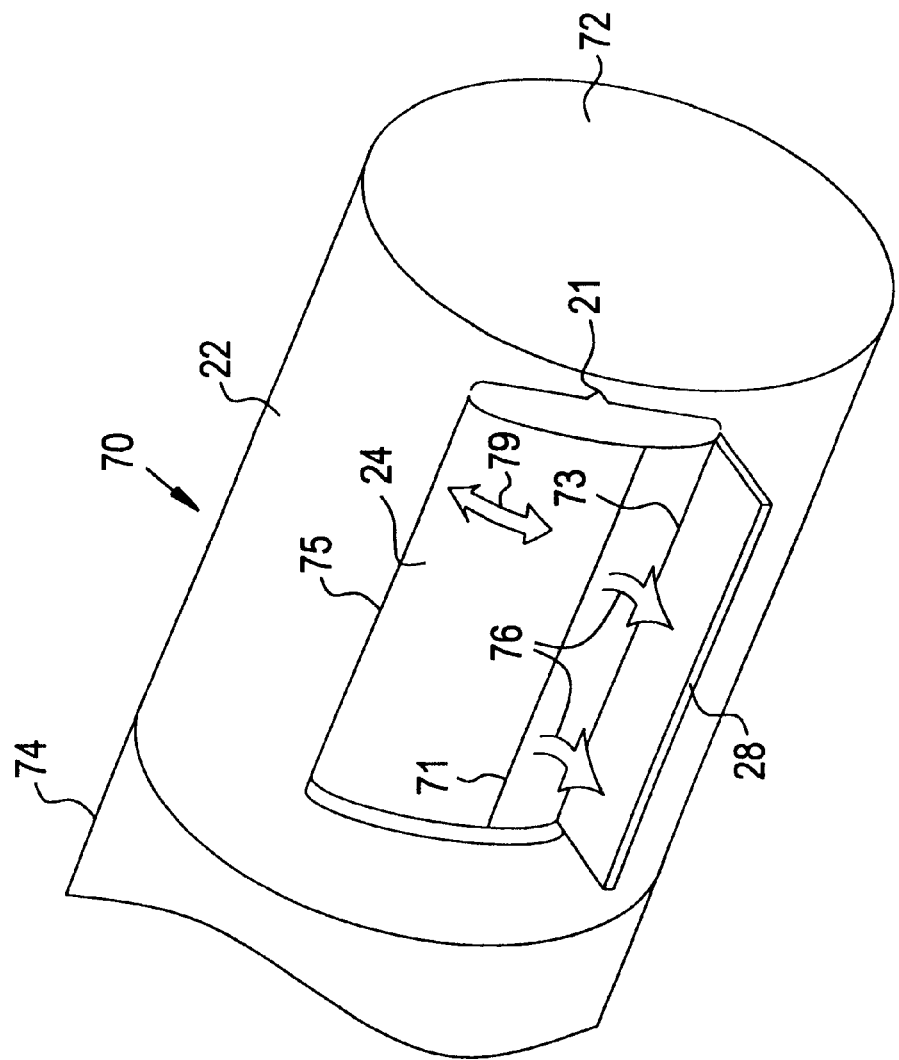
FIG. 7 is a side isometric view of the improved jet thruster system from a viewpoint to the left rear of the helicopter showing the left diverter in an open position.

FIG. 7 is an isometric view of the left side of the jet thruster assembly 70 with the air jet 76 flowing out through the opening created between the upper edge 71 of the single window in the inner thruster assembly 24 and the lower edge 73 of the left side window 21 in the outer thruster assembly 22. The left side movable diverter 28 is deployed in the open position. Also shown in this view is the tail boom 74 to which is attached the outer thruster assembly 22. The tail cone 72 is attached to the other end of the outer thruster assembly 22.

The various details of the mechanisms which rotate the inner thruster assembly and their interconnections with the control system of the helicopter, the system which generates the low pressure air within the tail boom, and the operating details of the remainder of the NOTAR anti-torque and yaw control system are disclosed in U.S. Pat. Nos. 4,200,252 and 4,948,068, which have been incorporated herein by reference in their entirely.

The system of the present invention represents a significant improvement to the NOTAR system. The switch from an outer rotating thruster assembly to an inner rotating thruster assembly has a number of benefits. The interior of the inner rotating thruster assembly can be built with vanes and air ramps that have optimized air flow characteristics. Putting the non-rotating thruster assembly on the outside provides for a simpler and more robust structure and also avoids the high wear characteristics of the prior system. With the non-rotating thruster assembly on the outside, the addition of diverters is made possible. The diverters further increase the efficiency of the system and remove the yaw-pitch coupling present in the prior NOTAR system.

Although various embodiments of the present invention have been described in detail hereinabove, it should be clearly understood that many variations and/or modifications of the basic inventive concepts herein taught which may become apparent to those skilled in the pertinent art will still fall within the spirit and scope of the present invention as defined in the appended claims.

What is claimed is:

1. An improved jet thruster system attached to the end of a hollow tail boom on a helicopter, through which boom passes air for expulsion by the jet thruster system, the system comprising:

a non-rotating, substantially cylindrically shaped, outer thruster assembly attached to the end of the boom and having laterally opposing outer thruster windows providing respective air passages outwardly extending therethrough;

a substantially cylindrically-shaped inner thruster assembly nested within the outer thruster assembly, capable of rotation about its cylindrical axis and having an inner thruster window providing an air passage outwardly therethrough and disposed so as to be able to at least partially overlap a selected one of the outer thruster windows, the selected outer thruster window depending upon the angular orientation of the inner thruster assembly relative to the outer thruster assembly; and at least one flow diverter having a first end portion extending substantially parallel to the cylindrical axis of the inner thruster assembly and attached to the outer thruster assembly at a location adjacent a lower edge of one of the outer thruster windows, and having an opposite end portion extendable in an outwardly direction from the outer thruster window, thereby creating a substantially horizontal air jet when the inner thruster window is rotated into an at least partially overlapping position with respect to the outer thruster window.

2. The system of claim 1, wherein the inner thruster assembly includes at least one vane to redirect the air flow from an axial flow with the inner thruster assembly to a lateral flow out through the window in the inner thruster assembly.

3. The system of claim 1, wherein the inner thruster assembly includes an air ramp means at the rear of the inner thruster assembly to redirect the air flow from an axial flow with the inner thruster assembly to a lateral flow out through single window in the inner thruster assembly.

4. The system of claim 1, wherein the opposing lateral windows in the outer thruster assembly comprise at least two smaller openings that are bounded by the perimeters of the opposing lateral windows.

5. The system of claim 1, wherein the window in the inner thruster assembly comprises at least two smaller openings that are bounded by the perimeter of the window.

6. The system of claim 1, wherein a rotatable hinge assembly joins the first end portion of the at least one diverter to the lower edge of the outer thruster window, whereby said at least one diverter is rotatable between a closed position for blocking the expulsion of air from the jet thruster system and an open position for allowing expulsion of a substantially horizontal jet of air from the jet thruster system when the inner thruster assembly is rotated into an at least partially overlapping position with respect to an outer thruster window.

7. The system of claim 1, wherein the at least one diverter is fixed in an open position extending outwardly from the outer thurster window, thereby allowing expulsion of a substantially horizontal jet of air from the jet thruster system when the inner thruster assembly is rotated into an at least partially overlapping position with respect to an outer thruster window.

8. The system of claim 1, wherein a separate diverter is positioned on each side of the outer thruster, with each diverter having a first end portion extending substantially parallel to the cylindrical axis of the inner thruster assembly and attached to the lower edge of one of the opposing outer thruster windows.

9. An improved jet thruster system attached to the end of a hollow tail boom on a helicopter, through which boom passes air for expulsion by the jet thruster system, the system comprising:

a non-rotating, substantially cylindrically-shaped, outer thruster assembly attached to the end of the boom and having two laterally opposing outer thruster windows providing respective air passages outwardly therethrough;

a substantially cylindrically-shaped inner thruster assembly nested within the outer thruster assembly, capable of rotation about its cylindrical axis and having an inner thruster window providing an air passage outwardly therethrough, and disposed so as to at least partially overlap a selected one of the outer thruster, the selected outer thruster window depending upon the angular orientation of the inner thruster assembly relative to the outer thruster assembly;

a movable flow diverter having a first end portion extending substantially parallel to the cylindrical axis of the inner thruster assembly and attached by hinge means to the outer thruster at a position adjacent to a lower edge of at least one of the outer thruster windows;

means to urge the movable diverter into an outwardly open position when the inner thruster window is rotated into an at least partially overlapping position with respect to a respective outer thruster window;

wherein said means comprising at least one cam ring is disposed radially about the outside surface of the inner thruster assembly, said cam ring having a first high portion having a first thickness and a lower second portion having a second, lesser thickness; and, at least one cam follower attached to an arm that is attached to an outer thruster window such that when the cam follower is in contact with the first portion of the cam ring it engages, the movable diverter is in a closed position substantially parallel with the outer surface of the inner thruster assembly and, when the cam follower is in contact with the second portion of the cam ring it engages the movable diverter is in an open position.

10. The system of claim 9, wherein the open position of the movable diverter allows the air expulsed from the overlap between the window in the inner thruster assembly and the respective window in the outer thruster assembly to be expulsed in a substantially horizontal direction.

11. The system of claim 9, wherein the inner thruster assembly contains at least one vane to redirect the air flow from an axial flow with the inner thruster assembly to a lateral flow out through the window in the inner thruster assembly.

12. The system of claim 9, wherein the inner thruster assembly includes an air ramp means at the rear of the inner thruster to redirect the air flow from an axial flow with the inner thruster assembly to a lateral flow out through the window in the inner thruster assembly.

13. The system of claim 9, wherein the opposing lateral windows in the outer thruster assembly comprise at least two smaller openings that are bounded by the perimeters of the opposing lateral windows.

14. The system of claim 9, wherein the window in the inner thruster assembly comprises at least two smaller openings that are bounded by the perimeter of the window.

15. An improved jet thruster system attached to the end of a hollow tail boom on a helicopter, through which boom passes air for expulsion by the jet thruster system, the system comprising:

a non-rotating, substantially cylindrically shaped, outer thruster assembly attached to the end of the boom and having laterally opposing outer thruster windows providing respective air passages outwardly extending therethrough;

a substantially cylindrically-shaped inner thruster assembly nested within the outer thruster assembly, capable of rotation about its cylindrical axis and having an inner thruster window providing an air passage outwardly therethrough and disposed so as to be able to at least partially overlap a selected one of the outer thruster windows, the selected outer thruster window depending upon the angular orientation of the inner thruster assembly relative to the outer thruster assembly; and the inner thruster assembly including at least one vane attached to an inner wall and rotatable with the inner thruster assembly to redirect the flow of air within the inner thruster assembly from a direction parallel to the cylindrical axis of the inner thruster to a lateral direction substantially perpendicular to the cylindrical axis, whereby the air flows out of the inner thruster assembly through the inner thruster window.

16. The system of claim 15, wherein a plurality of separate vanes are disposed substantially parallel to one another and are each mounted to the inner thruster assembly for joint rotation about the cylindrical axis of the inner thruster assembly.

17. The system of claim 15, wherein a curved air ramp is attached to an inner wall of the inner thruster assembly for joint rotation about the cylindrical axis of the inner thruster assembly to redirect the flow of air within the inner thruster assembly from a direction substantially parallel to the cylindrical axis to a direction substantially perpendicular to the cylindrical axis, whereby the air flows out of the inner thruster assembly through the inner thruster window.

* * * * *